US010469390B2

(12) United States Patent
Amulothu et al.

(10) Patent No.: US 10,469,390 B2
(45) Date of Patent: Nov. 5, 2019

(54) LOAD BALANCING WITH SOFTWARE DEFINED NETWORK CONTROLLERS

(71) Applicant: International Business Machines Corporation, Armonk, NY (US)

(72) Inventors: Venkata Siva N. Amulothu, Plano, TX (US); Ashish Kapur, Santa Clara, CA (US); Vishal Shukla, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 15/078,009

(22) Filed: Mar. 23, 2016

(65) Prior Publication Data
US 2017/0279722 A1 Sep. 28, 2017

(51) Int. Cl.
*H04L 12/803* (2013.01)
*H04L 12/717* (2013.01)

(52) U.S. Cl.
CPC ............ *H04L 47/125* (2013.01); *H04L 45/42* (2013.01)

(58) Field of Classification Search
CPC ....... H04L 47/10–47/125; H04L 45/00–45/74; H04L 65/00–65/80
See application file for complete search history.

(56) References Cited

U.S. PATENT DOCUMENTS

| 2010/0036903 A1* | 2/2010 | Ahmad ................... G06F 9/505 709/202 |
| 2010/0161760 A1* | 6/2010 | Maloo ............... H04L 29/12066 709/219 |
| 2015/0016260 A1* | 1/2015 | Chow ..................... H04L 45/22 370/235 |
| 2015/0169345 A1 | 6/2015 | DeCusatis et al. |
| 2015/0271270 A1* | 9/2015 | Edlund ................. H04L 67/148 709/227 |
| 2016/0080259 A1* | 3/2016 | Biancaniello ........... H04L 45/74 709/203 |
| 2016/0170848 A1* | 6/2016 | Yang ................... G06F 11/2023 714/4.12 |

FOREIGN PATENT DOCUMENTS

CN 103795805 A 5/2014

OTHER PUBLICATIONS

Hsieh et al., "Load balancing virtual machines deployment mechanism in SDN open cloud platform", Advanced Communication Technology (ICACT), 2015 17th International Conference on Jul. 1-3, 2015, pp. 329-335, DOI: 10.1109/ICACT.2015.7224814.

* cited by examiner

Primary Examiner — Clayton R Williams
(74) Attorney, Agent, or Firm — Isaac J. Gooshaw

(57) ABSTRACT

A method, computer program product and computer system is provided. A processor receives at least one tunnel endpoint load information of a plurality of virtual network tunnel endpoints associated with a first virtual network. A processor receives a request directed to the first virtual network from a requesting virtual machine of a second virtual network. A processor generates a destination network address of a virtual network tunnel endpoint associated with the first virtual network based, at least in part, on the at least one load information of the plurality of virtual network tunnel endpoints. A processor sends the destination network address to the requesting virtual machine.

17 Claims, 6 Drawing Sheets

LOAD BALANCING WITH SOFTWARE DEFINED NETWORK CONTROLLERS

BACKGROUND OF THE INVENTION

The present invention relates generally to the field of software defined networking, and more particularly to load balancing in a software defined network.

Information technology (IT) resources, such as computer processors and networks, are being called upon to support ever greater processing demands, leading to the need for server footprints of increasing size to accommodate these expanding workloads. Virtualization provides a way to abstract the components of today's IT resources to consolidate, integrate, and simplify the required infrastructure and reduce the overall cost of IT resource ownership.

Server virtualization technology allows for the configuration and deployment of multiple logical server configurations on a common physical footprint to provide processing and usage benefits beyond those of the physical configuration. The physical server's resources are abstracted to accommodate the concurrent deployment of multiple instances of virtual processors. Each virtual instance, called a virtual machine (VM), is capable of operating a separate operating system (OS) instance and its associated software stacks as if each instance was deployed on a separate physical server. This virtual view offers the benefit of not being restricted by the implementation or configuration of the underlying physical server resources. Each virtual processor instance provides a subset or superset of the various physical server resources that may be dedicated or concurrently shared by multiple VM abstractions. By using processor virtualization technologies, the system's processors can be transparently multi-programmed and multi-processed by a virtualization hypervisor to optimize processor sharing by multiple VM instances, thereby increasing processor utilization.

In traditional IT network architectures there is no centralized network control. Routing tables located locally in network devices, such as switches, bridges, gateways, routers, or firewalls, are individually configured to direct network traffic to neighboring nodes of the network. The network devices may make control decisions and forward network traffic accordingly. Traditional network architectures are contrasted with software-defined networking (SDN), where network traffic routing decisions are centrally controlled and made by a controller that creates tables to define flow paths through the network. The controller decouples control decisions about where traffic is sent from network devices that forward traffic to a selected destination.

SUMMARY

Embodiments of the present invention provide a method, computer system, and computer program product to provide load balancing in virtual networks. A processor receives at least one tunnel endpoint load information of a plurality of virtual network tunnel endpoints associated with a first virtual network. A processor receives a request directed to the first virtual network from a requesting virtual machine of a second virtual network. A processor generates a destination network address of a virtual network tunnel endpoint associated with the first virtual network based, at least in part, on the at least one load information of the plurality of virtual network tunnel endpoints. A processor sends the destination network address to the requesting virtual machine.

DETAILED DESCRIPTION

Figure 1:
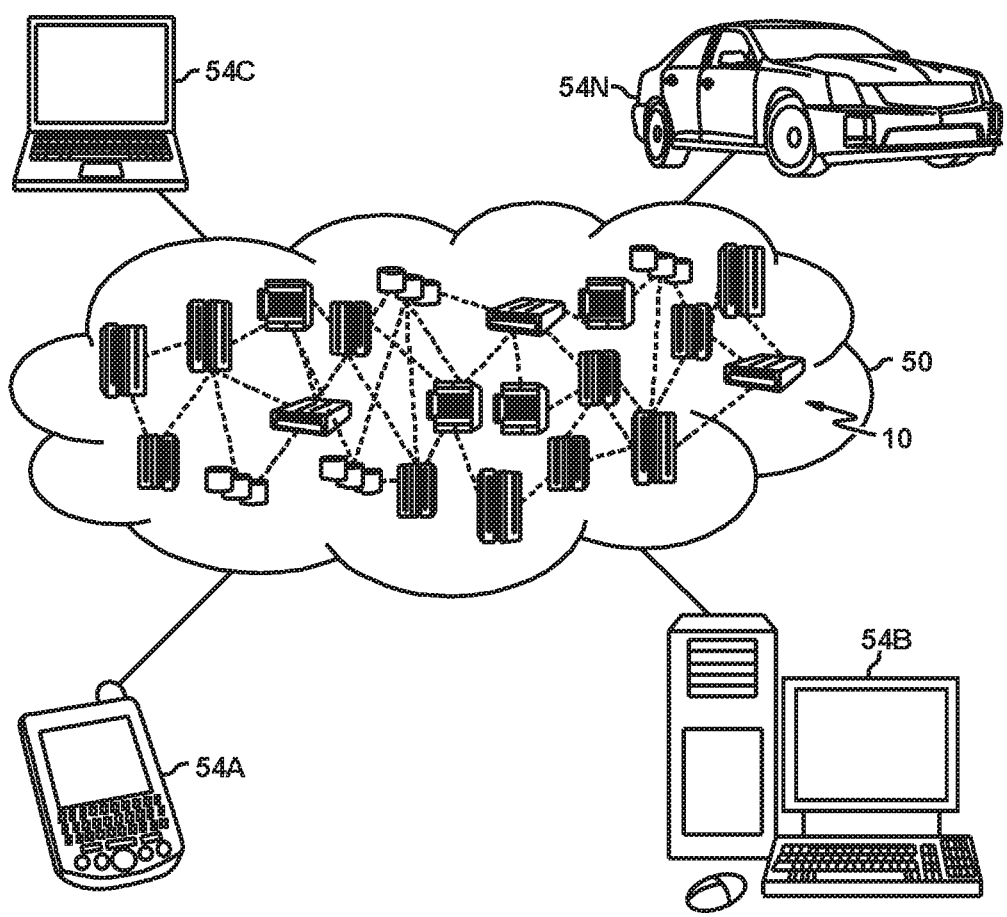
FIG. 1 depicts a cloud computing environment according to an embodiment of the present invention.

While solutions to load balancing in a software defined network (SDN) are known, they typically require an additional load balancing layer to the SDN. As such, prior load balancing solutions increase complexity in managing the SDN by adding another entity for management. Furthermore, the additional management of a load balancing layer hinders scalability when adding new hosts and virtual machines (VMs) to the SDN. Embodiments of the present invention recognize that by implementing Virtual Extensible Local Access Networks (VXLAN or VLAN) logically connected by VXLAN tunnel endpoints, or VTEPs, load information from the VTEPs can be gathered by a SDN controller.

VXLANs provide a logical network for VMs across different physical networks. VTEPs provide virtualized switches that connect various VMs of a VXLAN, even though they may be on different physical networks. Therefore, a VTEP can provide information that impacts the loads of connected VMs and VTEPs, including total VTEP bandwidth and individual virtual port bandwidth (e.g., bandwidth of a connected VM) of the VTEPs. The VTEPs provide the collected information to the SDN controller, which in turn uses the collected information for load balancing. For example, a VXLAN provides VMs for a database service. An incoming request to start a database session is received by the SDN controller. Based on the information provided by the VTEPs, the SDN controller determines the optimal VTEP and VM to provision for the database session. By removing the load balancing layer and collecting VTEP information, embodiments of the present invention provide an SDN controller that provides load balancing in a software defined network. Advantageously, embodiments of the present invention provide load balancing the decreases complexity of the software defined network while increasing in scalability of the software defined network by removing the load balancing layer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
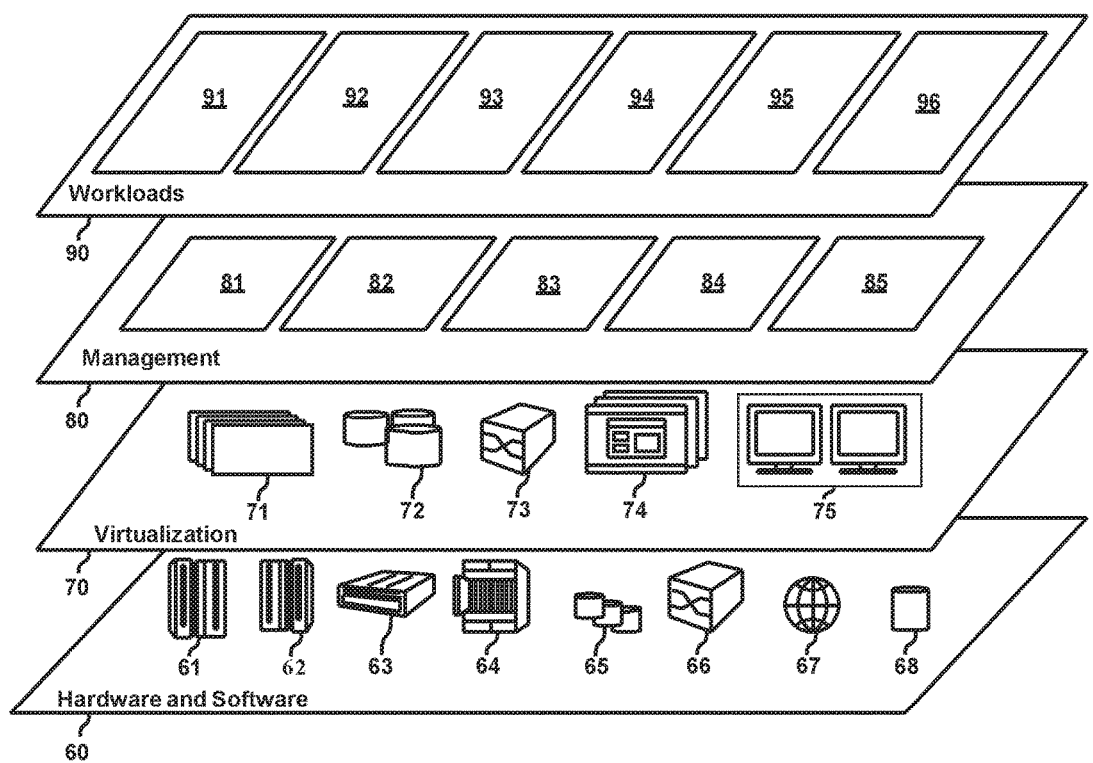
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Metering and Pricing 81 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 82 provides access to the cloud computing environment for consumers and system administrators. Service level management 83 provides cloud computing resource allocation and management such that required service levels are met. Service Level Agreement (SLA) planning and fulfillment 84 provide pre-arrangement for, and procurement of, cloud computing resources for which a future requirement is anticipated in accordance with an SLA. Resource provisioning 85 provides dynamic procurement of computing resources and other resources that are utilized to perform tasks within the cloud computing environment. In some scenarios, resource provisioning 85 provides load balancing in cloud computing environment 50 based on information gathered from virtualization layer 70 including but not limited to current bandwidth, allocated bandwidth, and the type of network traffic sent and received from virtual tunnel endpoints (VTEPs) in one or more virtual networks 73.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 3:
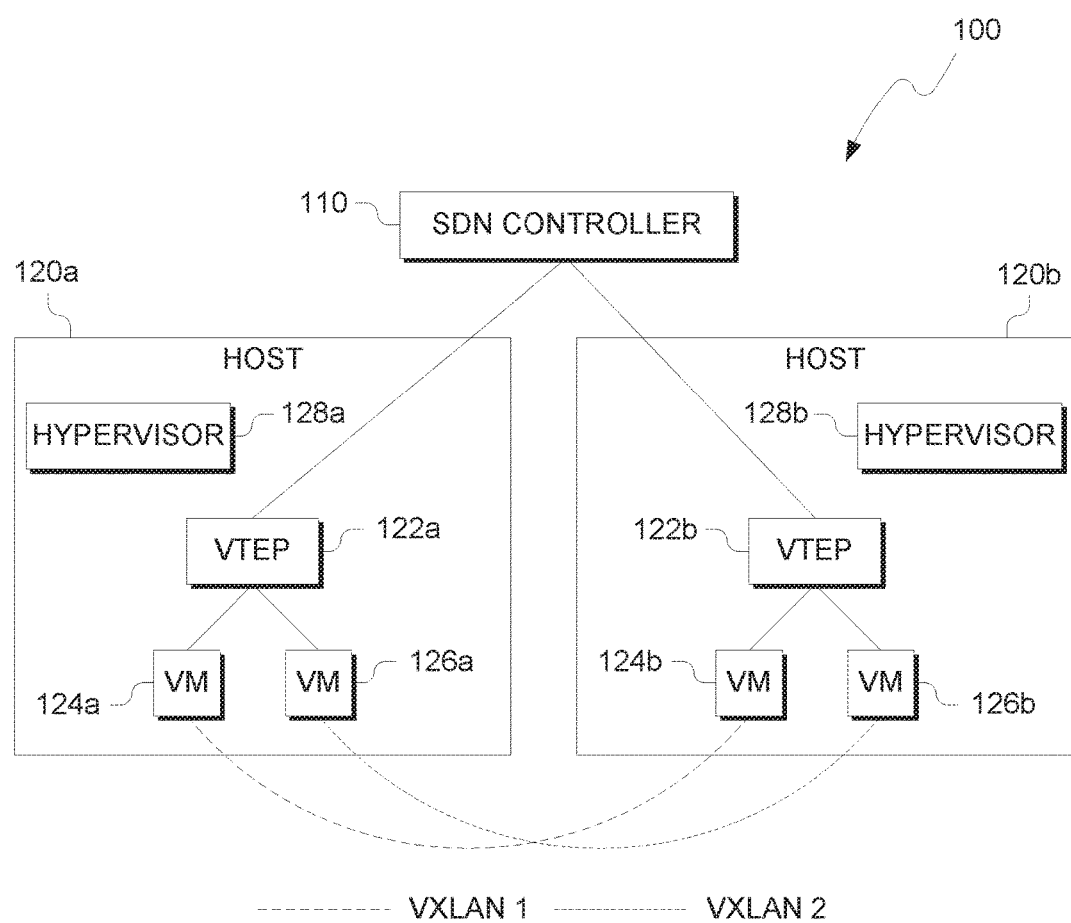
FIG. 3 illustrates a software defined network (SDN) environment for load balancing, in accordance with an embodiment of the present invention.

FIG. 3 illustrates a software defined network (SDN) environment, generally designated 100, for load balancing. In various embodiments, SDN environment 100 includes SDN controller 110 and hosts 120*a-b*. SDN controller 110 manages traffic between virtual network tunnel endpoints (VTEPs) 122*a-b*. VTEPs 122*a-b* send and receive traffic to the respective virtual machines (VMs) (i.e., VTEP 122*a* sends and receives traffic for VMs 124*a* and 126*a* and VTEP 122*b* sends and receives traffic for VMs 124*b* and 126*b*). Hosts 120*a-b* provide computing resources to execute the respective VTEPs and VMs provisioned to the host. Hosts 120*a-b* includes respective hypervisors 128*a-b* to manage the computing resource of the host in order to provide execution of the respective VTEPs and VMs provisioned to the host. One of ordinary skill in the art will appreciate that other embodiments and arrangements of SDN environment 100 may be provided without deviating from the present invention. In some embodiment, a host of hosts 120*a-b* include multiple VTEPs with respective VMs. In some embodiments, a VTEP of VTEPs 122*a-b* is not virtualized and implemented as a physical device (e.g., a Layer 2 (L2) switch or part of a Layer 3 (L3) router). In some embodiments, more than one hypervisor of hypervisors 128*a-b* are included per hosts 120*a-b*. For example, a hypervisor is provided for each VM, a subset of VMs, or VTEPs for a given host.

In various embodiments, SDN environment 100 includes one or more virtual networks. In some scenarios, virtual networks provide a logical network link between devices, or virtualized devices, even though a different physical network connects the devices. In other scenarios, a physical network includes multiple virtual networks. In both scenarios, SDN environment 100 provides virtual networks for VMs 124*a-b* and 126*a-b* through a variety of various virtualization techniques or protocols, such as, but not limited to, VXLAN encapsulation or VXLAN tagging through IEEE 802.1Q. VXLAN encapsulation takes a Ethernet Frame sent from a VM and encapsulates the frame as a payload in a packet over the physical networks. The packet includes source and destination MAC addresses and IP addresses for routing. Additionally, the packet includes a VXLAN ID to identify the virtual network of the destination VM. The VXLAN ID provides SDN controller with the information needed to deliver the payload frame to the destination VM. One of ordinary skill in the art will appreciate that any type of virtualization techniques may be used to configure a virtual network without deviating from the invention.

Referring to FIG. 3, SDN environment 100 includes two virtual networks. A first virtual network, VXLAN 1, is configured for VMs 124*a-b*. A second virtual network, VXLAN 2, is configured for VMs 126*a-b*. In one scenario, hosts 120*a-b* are connected to different sub-nets of SDN environment 100. In an example of this scenario, VM 124*a* sends a frame to communicate with VM 126*b*. Since, for the perspective of VMs 124*a-b*, VM 124*b* is on the same network the frame is sent to VTEP 122*a*. VTEP 122*a* encapsulates the frame for transport over SDN environment 100. During operation, VTEP 122*a* performs occasional multicast messages to various hosts, VTEPs and VMs of SDN environment 100 to determine IP and MAC addresses of the devices or virtual devices for the various networks of SDN environment 100. For example, a VTEP sends an Address Resolution Protocol (ARP) request for MAC addresses of devices connected to the virtual network associated with the VTEP and other networks, physical or virtual. In various embodiments, the VTEPs send the encapsulated packet to SDN controller 110. Based on the destination MAC and IP addresses in the encapsulated packet, SDN controller 110 sends the packet to a corresponding VTEP (e.g., VTEP 122*b*) based on the addressing of the packet. The VTEP, in turn sends the payload (i.e., the original Ethernet frame) to the corresponding VM (e.g., VM 124*b*), thereby virtualizing a local network (e.g., VXLAN 1).

In some scenarios and embodiments, a VM requests a service or function of a VM, but does not provide a specific VM address. In other scenarios, a frame may include a destination MAC, however, SDN controller 110 inserts a different MAC address. As discussed herein, SDN controller receives network load information gathered from hosts, VTEPs, hypervisors and VMs to determine a destination address for incoming request. In such scenarios, SDN controller 110 provides load balancing for requests in a virtual network environment. Typically prior art solutions provide loads balancing as a separate stop or device in SDN network environment 100 between SDN controller 110 and hosts 120*a-b*. By providing load balancing by the SDN controller, embodiments of the present invention advantageously provide a simpler network architecture to maintain which benefits design and scalability.

In one example scenario, SDN environment 100 provides two virtual networks, a first virtual network supporting a public cloud service, such as a web client application, and a second virtual network supporting a private cloud service, such as a web server application. Each network includes multiple hosts to provide instantiations of VTEPs and VMs. When a public user request access to a web client application, SDN controller 110 directs a hypervisor of a host of the first virtual network to provision a VM for the web client application. Additionally, the hypervisor of the host provisions a VTEP to handle virtual network traffic between SDN controller 110 and any provisioned VMs on the host.

In this example, the web client application requests services from a web server application to provide information to the user, such as database queries used to populate data on a web page. The VM sends a frame to the VTEP with a destination MAC address associated with a virtual device of the second virtual network. If the VTEP includes a destination IP address associated with the MAC address, then the VTEP encapsulates the frame with the destination IP. If the VTEP is unaware of the destination IP address, then the VTEP sends an IP multicast to discover the destination IP address, encapsulating the frame with the destination IP address. In some scenarios, SDN controller 110 performs multicasts and maintains address information for all connected hosts, VTEPs and VMs for each virtual network.

The VTEP sends the encapsulated frame as a packet to SDN controller 110. SDN controller 110 performs packet inspection to determine the destination virtual network. Based on current network load information, SDN controller 110 changes the destination addresses, both IP and MAC, of the packet to select a host and VM to provide optimal load balancing across the virtual networks. By inspecting incoming packets and analyzing network loads, SDN controller 110 can provision or select VMs without need of a separate load balancing layer for the virtual network. SDN controller 110 forwards the packet to the VTEP associated with the selected VM. The receiving VTEP decapsulates the packet to the frame for receiving by the selected VM. The selected VM confirms receipt to the originating VM to establish the service requested.

In various embodiments, SDN controller 110 receives network load information associated with hosts 120a-b, VTEPs 124a-b, and VMs 124a-b and 126a-b. In some scenarios, hosts 120a-b, VTEPs 124a-b, and VMs 124a-b and 126a-b periodically send network load information to SDN controller 110. In other scenarios, SDN controller 110 polls hosts 120a-b, VTEPs 124a-b, and VMs 124a-b and 126a-b for current network load information. Additionally, as VMs are provisioned on a host machine a hypervisor managing the VM sends network load information to SDN controller. Network load information includes, but is not limited to, (i) a current bandwidth used by the host, VTEP, or VM; (ii) an allocated bandwidth for the host, VTEP, or VM; (iii) the current number of sessions hosted by the host, VTEP, or VM; and (iv) the type of sessions hosted by the host, VTEP, or VM.

In some embodiments, the VTEPs of the host (e.g., VTEP 122a of host 120a) provide network load information for VMs virtually connected to the VTEP (e.g., VMs 124a and 126a) to SDN controller 110. In some scenarios, the VTEP consolidates or combines the network load information of the connected VMs to provide network load information handled by the VTEP. In other embodiments, VMs provide SDN controller 110 with network load information associated with the VM. In another embodiments, the hypervisor of the host (e.g., hypervisor 128a) monitors network traffic of any provisioned VTEPs and VMs. The hypervisor provides network load information any provisioned VTEPs and VMs and, in addition, consolidates network load information to provide total network load information for the host (e.g., host 120a).

In various embodiments, SDN controller 110 provides load balancing for traffic in one or more virtual networks based on the received network load information of the hosts, VTEPs, and VMs of SDN environment 100. SDN controller directs packets and requests to hosts, VTEPs and VM associated with a destination virtual network to provide optimal usage of resources of the SDN environment 100. In one scenario, SDN controller 110 selects a VTEP from a group of VTEPs based on the current consolidated bandwidth handled by the each VTEP. For example, if one VTEP currently has less bandwidth than another VTEP, the SDN controller 110 selects the first VTEP as a destination. In another scenario, SDN controller 110 selects a VTEP based on a ratio between the current bandwidth and allocated bandwidth of each VTEP. For example, if one VTEP currently has 8 gigabits per second (gbps) of bandwidth and 10 gbps of allocated bandwidth and another VTEP has 9 gbps of current bandwidth and 10 gbps of allocated bandwidth, then SDN controller 110 selects the first VTEP since the VTEP is less utilized than the latter (i.e., 80% utilization of allocated bandwidth versus 90% utilization).

In another scenario, SDN controller 110 selects a VTEP based on the total number of sessions or connections the VTEP is currently handling. For example, a first VTEP is handling 150 active sessions and another VTEP is handling 200 active sessions. In this scenario, SDN controller 110 selects the first VTEP with less active sessions. In one scenario, SDN controller 110 considers the type of active connections. Certain connections types consume more resources and bandwidth than other types. For example, a hypertext transfer protocol (HTTP) connection typically requires less resources (e.g., processing power) and bandwidth than a secure socket layer (SSL) connection. When comparing connection types, SDN controller 110 assigns a resource factor for each type and multiplies the factor by the active connections of each type. For example, a HTTP connection is assigned a 0.25 resource factor and SSL connection is assigned a 0.75 resource factor, reflecting the increase in resource usage a SSL connection has relative to a HTTP connection. In this example, a first VTEP has 50 active HTTP connection and 10 active SSL connections, resulting in a total resource usage factor of 20 (i.e., 50*0.25+ 10*0.75=20.0). A second VTEP has 5 active HTTP connections and 35 active SSL connections, resulting in a total resource usage factor of 27.5 (i.e., 5*0.25+35*0.75=27.5). Even though the first VTEP has more active connections, the usage is less due to the larger amount of resource "light" HTTP requests, when compared to the larger amount of resource "heavy" SSL requests. As such, SDN controller 110 selects the first VTEP since the resources used by the active connections is less than the second VTEP, based on the number and type of connection currently active for both.

In various embodiments, SDN controller 110 collects network load information for each connected host, VTEP or VM. In some scenarios, each host, VM and VTEP sends network load information to SDN controller 110. In other scenarios, a hypervisor of the host collects and sends network load information to SDN controller 110. As discussed herein, network load information includes, but is not limited to, (i) a current bandwidth used by the host, VTEP, or VM; (ii) an allocated bandwidth for the host, VTEP, or VM; (iii) the current number of sessions hosted by the host, VTEP, or VM; and (iv) the type of sessions hosted by the host, VTEP, or VM. Upon selecting a VTEP, SDN controller 110 selects a VM for directing network traffic for load balancing in SDN environment.

Similar to selecting a VTEP, SDN controller 110 selects a VM associated with a VTEP based on current bandwidth, allocated bandwidth, and the number and type of active connections for each VM. As such, SDN controller selects, a VM with less current bandwidth, ratio of current to allocated bandwidth, active connections, or resource usage based on active connection types. In some scenarios, such as when more than one VTEP is provisioned for a host, SDN controller 110 selects VTEPs and VMs based on the current network load of a host. SDN controller combines all network load information for a host for each provisioned VTEP and VM of the host. Based on the current network load information for the provisioned VTEPs and VMs, SDN controller 110 selects a host, VTEP and VM from SDN environment 100.

In various embodiments of the present invention, SDN controller 110 is a computing device that can be a standalone device, a server, a laptop computer, a tablet computer, a netbook computer, a personal computer (PC), or a desktop computer. In another embodiment, SDN controller 110 represents a computing system utilizing clustered computers and components to act as a single pool of seamless resources. In general, SDN controller 110 can be any computing device or a combination of devices with access to network load information of hosts 120*a-b*, VTEPs 122*a-b*, VMs 124*a-b* and 126*a-b* and hypervisors 128*a-b*. SDN controller 110 may include internal and external hardware components, as depicted and described in further detail with respect to FIG. 6.

Figure 4:
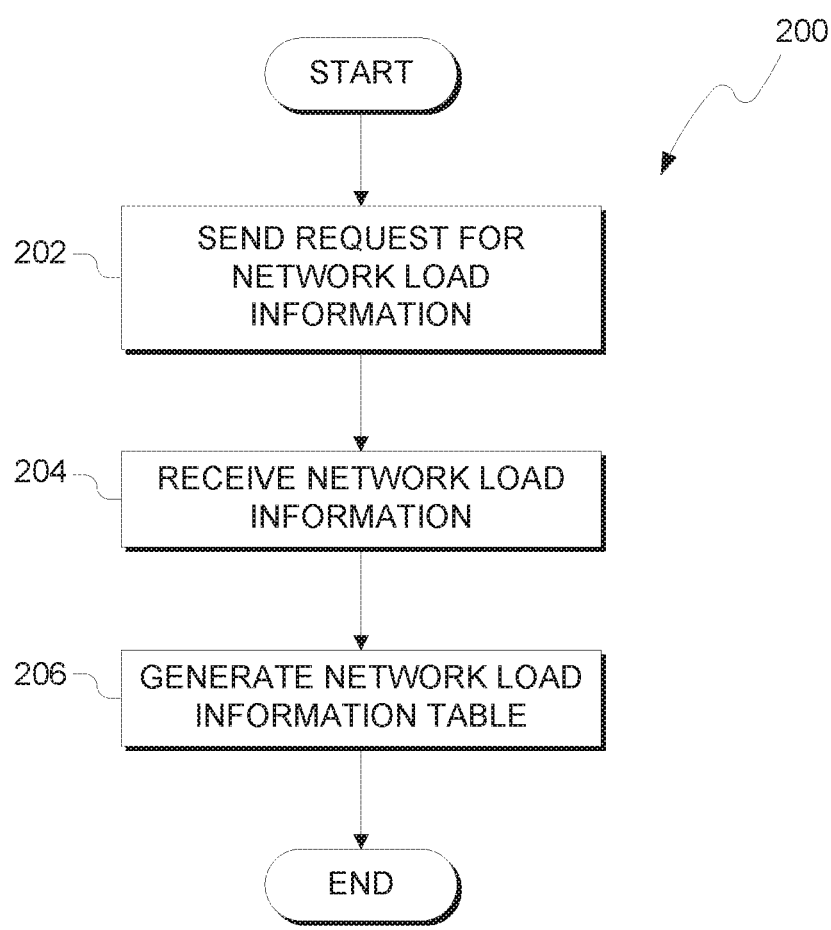
FIG. 4 illustrates operational processes of a SDN controller identifying a virtual network load, in accordance with an embodiment of the present invention.

FIG. 4 illustrates operational processes, generally designated 200, of SDN controller 110 identifying a virtual network load. In process 202, SDN controller 110 sends a request to the hosts 120*a-b*, VTEPs 122*a-b*, and VMs 124*a-b* and 126*a-b* for respective network load information for each device or virtual device. In some scenarios, SDN controller 110 periodically sends requests to the devices and virtual devices of SDN environment 100. In other scenarios, SDN controller 110 sends a request when receiving provisioning or directing an incoming request destined for a virtual network. SDN controller 110 polls the devices and virtual devices of the destination virtual network for network load information for provisioning or routing.

In process 204, SDN controller 110 receives the network load information for the devices and virtual devices of SDN environment 100. In some scenarios, the devices and virtual devices of SDN environment 100 occasionally send network load information without receiving a request from SDN controller (e.g., process 202 is not performed). For example, when a VM is provisioned, the VM or associated VTEP sends network load information to SDN controller 110. In some embodiments, a provisioned VTEP or VM includes an associated profile indicating allocated bandwidth and resource factors associated with the network load information. For example, some VMs may have a different allocated bandwidth than other VM when provisioned. In some embodiments, the connection between VTEP and VM includes a virtual port that is maintained by either the VTEP or host machine associated with the VM. In such embodiments, SDN controller 110 polls the VM port for network load information of the VM. In response, the virtual port of the VM provides network load information with the direct response of the VM.

In process 206, SDN controller 110 generates a network load information table with the received network load information for the devices and virtual devices of SDN environment 100. The table includes, but is not limited to, one or more of the following (i) a current bandwidth used by the host, VTEP, or VM; (ii) an allocated bandwidth for the host, VTEP, or VM; (iii) the current number of sessions hosted by the host, VTEP, or VM; and (iv) the type of sessions hosted by the host, VTEP, or VM. Upon selecting a VTEP, SDN controller 110 selects a VM for directing network traffic for load balancing in SDN environment. Additionally, in some scenarios, the network load information table includes routing and address information for each device or virtual device. Example routing and address information, a hypervisor IP address, a VTEP IP and MAC address, a virtual network ID, a virtual port number of a VM connected to a VTEP, and a VM IP and MAC address. Furthermore, the network load information table, in some scenarios, includes an allowed virtual network ID. In some scenarios, a virtual network is configured to only communicate with other virtual networks. For example, a public cloud (e.g., a web client service) may only be able to communicate with a specific private cloud (e.g., a web server service) but not other private clouds (e.g., a database service). As such, the network load information table includes address information for allowed virtual networks that a particular virtual network, and the devices or virtual devices comprising the particular virtual network, is or are permitted to have as a destination. The network load information table provides SDN controller 110 with the information to direct requests between virtual networks of SDN environment 100 and also provide load balancing among the devices and virtual device of SDN environment 100.

Figure 5:
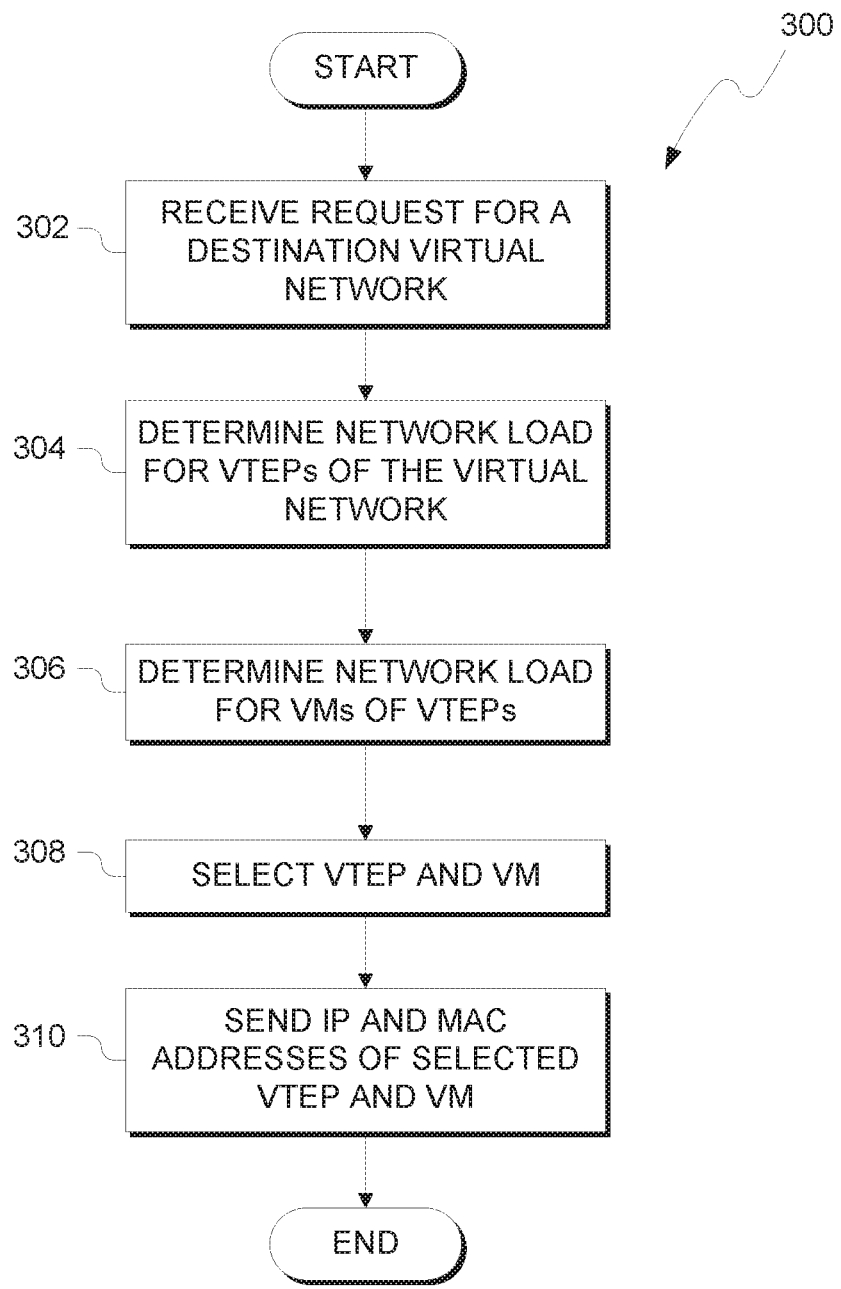
FIG. 5 illustrates operational processes of SDN controller directing traffic destined for a virtual network based on the destination virtual network's load, in accordance with an embodiment of the present invention.

FIG. 5 illustrates operational processes, generally designated 300, of SDN controller 110 directing traffic destined for a virtual network based on the destination virtual network's load. In process 302, SDN controller 110 receives a request for an address of a VTEP and VM associated with a destination virtual network. For example, a VM of a source virtual network requests a service provided by a VM of destination virtual network. In response, SDN controller 110 selects a VTEP and VM, provides the IP and MAC addresses and VTEP encapsulates the frame from the requesting VM with the received addresses for transport across SDN environment 100 to the destination virtual network and the selected VTEP and VM.

In process 304, SDN controller 110 determines the network loads of the VTEPs for the destination virtual network. Based on received network load information (FIG. 2, process 204), SDN controller 110 determines the utilization of each VTEP. In one example, SDN controller 110 bases utilization on the current bandwidth of each VTEP, where the lower amount of bandwidth VTEP is selected. In another example, SDN controller 110 bases utilization on the number of active connections of each VTEP, selecting the VTEP with smaller amount of active connections. In process 306, SDN controller 110 determines the network loads of the VMs of the destination virtual network. Based on received network load information (FIG. 2, process 204), SDN controller 110 determines the utilization of each VM. SDN controller selects VMs with lower utilization to provide load balancing in the destination virtual network. For example, a VM with lower bandwidth usage is selected over a VM with higher bandwidth usage. In some embodiments, a VTEP provides the network load information of connected VM. In other embodiments, a hypervisor of the host machine providing the VTEPs and VMs provides the network load information.

In process 308, SDN controller 110 selects a destination VTEP and VM based on the network load information and determined network loads. In some scenarios, SDN controller 110 selects a VTEP based on network load of the VTEP, where the VTEP has a smaller load than other VTEPs. SDN controller 110 then selects a VM associated with the selected VTEP, where the VM has a smaller load than other VMs connected to the selected VTEP. In another scenario, SDN controller 110 considers VM loads before selecting a VTEP. In one example, a first VTEP has a comparatively smaller load than second VTEP. However, a VM of the second VTEP has a considerably smaller load than any VM of the first VTEP. In this scenario, SDN controller 110 selects the second VTEP and the corresponding VM in order to balance the load of processing across the virtual network.

In process 310, SDN controller 110 provides the IP and MAC addresses of the selected VTEP and VM of the destination virtual network to the requesting VM from process 302. The VM creates an Ethernet frame with the destination VM MAC addresses and destination VTEP IP addresses in the payload packet of the frame. The VTEP of the requesting VM encapsulates the frame for transport to the destination virtual network, and in, the selected destination VTEP and VM. The selected destination VTEP receives the encapsulated frame. The selected destination VTEP decapsulates the packet and forwards the original frame to the selected destination VM. In some embodiments, SDN controller intercepts virtual network packets and injects destination IP and MAC addresses based on the network load information, as discussed herein. One of ordinary skill in the art will appreciate that any method of direction or redirection of messages across two virtual networks may be used without deviating from the invention.

Figure 6:
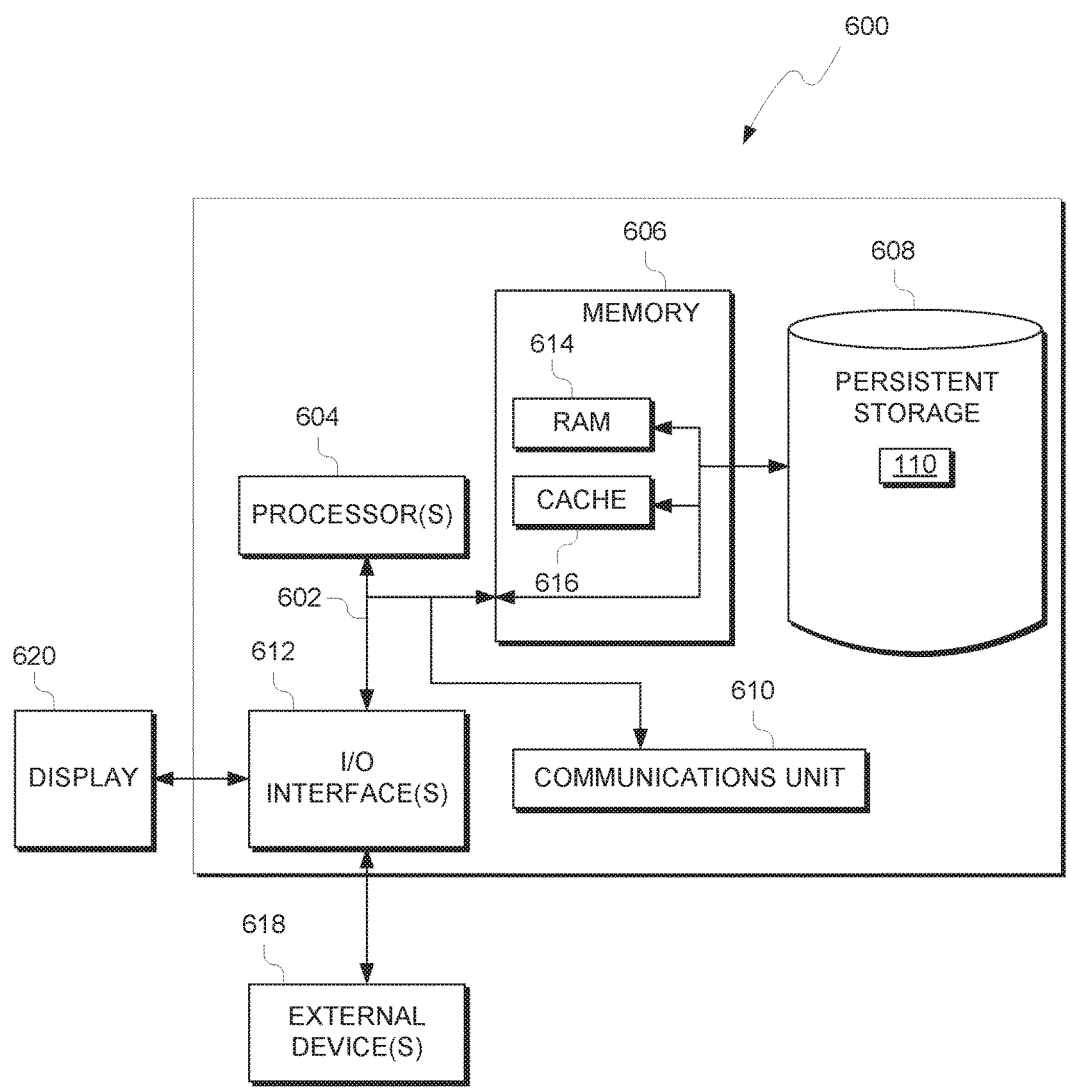
FIG. 6 depicts a block diagram of components of the computing device executing an SDN controller, in accordance with an exemplary embodiment of the present invention.

FIG. 6 depicts a block diagram, 600, of components of SDN controller 110, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

SDN controller 110 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

SDN controller 110 includes data and programs, to perform the methods discussed herein, that are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of SDN environment 100. In these examples, communications unit 610 includes one or more network interface cards. Communications unit 610 may provide communications through the use of either or both physical and wireless communications links. Various data and programs may be downloaded to persistent storage 608 through communications unit 610 to perform the methods discussed herein.

I/O interface(s) 612 allows for input and output of data with other devices that may be connected to SDN controller 110. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method for providing load balancing in a software defined network, the method comprising:
   receiving, by one or more processors, at least one tunnel endpoint load information of a plurality of virtual network tunnel endpoints associated with a first virtual network, wherein the at least one tunnel endpoint load information includes (i) a current tunnel endpoint bandwidth for a virtual network tunnel endpoint of the plurality of virtual network tunnel endpoints and (ii) an allocated tunnel endpoint bandwidth of the virtual network tunnel endpoint;
   receiving, by the one or more processors, a request directed to the first virtual network from a requesting virtual machine of a second virtual network;
   generating, by the one or more processors, a destination network address of the virtual network tunnel endpoint associated with the first virtual network based, at least in part, on a ratio of (i) the current tunnel endpoint bandwidth of the virtual network tunnel endpoint and (ii) the allocated tunnel endpoint bandwidth for the virtual network tunnel endpoint; and
   sending, by the one or more processors, the destination network address of the virtual network tunnel endpoint associated with the first virtual network to the requesting virtual machine, wherein (i) a controller of the software defined network injects the destination network address for one or more packets sent to the requesting virtual machine and (ii) the destination network address for the one or more packets includes the destination network address for the virtual network tunnel endpoint associated with the first virtual network.

2. The method of claim 1, wherein the tunnel endpoint load information includes one or more of the following: (i) current total number of active sessions for the plurality of virtual network tunnel endpoints; and (ii) current type of active sessions for the plurality of virtual network tunnel endpoints.

3. The method of claim 1, the method further comprising:
receiving, by the one or more processors, at least one virtual machine load information of a plurality of virtual machines associated with the first virtual network;
generating, by the one or more processors, a destination machine address of a second virtual machine associated with the first virtual network based, at least in part, on the at least one virtual machine load information from a plurality of virtual machines; and
sending, by the one or more processors, the destination machine address to the requesting virtual machine.

4. The method of claim 3, wherein the virtual machine load information includes one or more of the following: (i) current virtual machine bandwidth; (ii) allocated virtual machine bandwidth; (iii) current total number of active sessions for the plurality of virtual machines; and (iv) current type of active sessions for the plurality of virtual machines.

5. The method of claim 4, wherein generating the destination machine address of a second virtual machine is further based, at least in part, on a ratio of the current virtual machine bandwidth and the allocated virtual machine bandwidth for the plurality of virtual machines.

6. The method of claim 1, wherein generating the destination network address of a virtual network tunnel endpoint is further based, at least in part, on at least one amount of current host bandwidth associated with the plurality of virtual network tunnel endpoints.

7. A computer program product for providing load balancing in a software defined network, the computer program product comprising:
one or more computer-readable storage media and program instructions stored on the one or more computer-readable storage media, the program instructions comprising:
program instructions to receive at least one tunnel endpoint load information of a plurality of virtual network tunnel endpoints associated with a first virtual network, wherein the at least one tunnel endpoint load information includes (i) a current tunnel endpoint bandwidth for a virtual network tunnel endpoint of the plurality of virtual network tunnel endpoints and (ii) an allocated tunnel endpoint bandwidth of the virtual network tunnel endpoint;
program instructions to receive a request directed to the first virtual network from a requesting virtual machine of a second virtual network;
program instructions to generate a destination network address of the virtual network tunnel endpoint associated with the first virtual network based, at least in part, on a ratio of (i) the current tunnel endpoint bandwidth of the virtual network tunnel endpoint and (ii) the allocated tunnel endpoint bandwidth for the virtual network tunnel endpoint; and
program instructions to send the destination network address of the virtual network tunnel endpoint associated with the first virtual network to the requesting virtual machine, wherein (i) a controller of the software defined network injects the destination network address for one or more packets sent to the requesting virtual machine and (ii) the destination network address for the one or more packets includes the destination network address for the virtual network tunnel endpoint associated with the first virtual network.

8. The computer program product of claim 7, wherein the tunnel endpoint load information includes one or more of the following: (i) current total number of active sessions for the plurality of virtual network tunnel endpoints; and (ii) current type of active sessions for the plurality of virtual network tunnel endpoints.

9. The computer program product of claim 7, the program instructions further comprising:
program instructions to receive at least one virtual machine load information of a plurality of virtual machines associated with the first virtual network;
program instructions to generate a destination machine address of a second virtual machine associated with the first virtual network based, at least in part, on the at least one virtual machine load information from a plurality of virtual machines; and
program instructions to send the destination machine address to the requesting virtual machine.

10. The computer program product of claim 9, wherein the virtual machine load information includes one or more of the following: (i) current virtual machine bandwidth; (ii) allocated virtual machine bandwidth; (iii) current total number of active sessions for the plurality of virtual machines; and (iv) current type of active sessions for the plurality of virtual machines.

11. The computer program product of claim 10, wherein program instructions to generate the destination machine address of a second virtual machine is further based, at least in part, on a ratio of the current virtual machine bandwidth and the allocated virtual machine bandwidth for the plurality of virtual machines.

12. The computer program product of claim 7, wherein program instructions to generate the destination network address of a virtual network tunnel endpoint is further based, at least in part, on at least one amount of current host bandwidth associated with the plurality of virtual network tunnel endpoints.

13. A computer system for providing load balancing in a software defined network, the computer system comprising:
one or more computer processors;
one or more computer readable storage media; and
program instructions stored on the computer readable storage media for execution by at least one of the one or more processors, the program instructions comprising:
program instructions to receive at least one tunnel endpoint load information of a plurality of virtual network tunnel endpoints associated with a first virtual network, wherein the at least one tunnel endpoint load information includes (i) a current tunnel endpoint bandwidth for a virtual network tunnel endpoint of the plurality of virtual network tunnel endpoints and (ii) an allocated tunnel endpoint bandwidth of the virtual network tunnel endpoint;
program instructions to receive a request directed to the first virtual network from a requesting virtual machine of a second virtual network;

program instructions to generate a destination network address of the virtual network tunnel endpoint associated with the first virtual network based, at least in part, on a ratio of (i) the current tunnel endpoint bandwidth of the virtual network tunnel endpoint and (ii) the allocated tunnel endpoint bandwidth for the virtual network tunnel endpoint; and program instructions to send the destination network address of the virtual network tunnel endpoint associated with the first virtual network to the requesting virtual machine, wherein (i) a controller of the software defined network injects the destination network address for one or more packets sent to the requesting virtual machine and (ii) the destination network address for the one or more packets includes the destination network address for the virtual network tunnel endpoint associated with the first virtual network.

14. The computer system of claim 13, wherein the tunnel endpoint load information includes one or more of the following (i) current total number of active sessions for the plurality of virtual network tunnel endpoints; and (ii) current type of active sessions for the plurality of virtual network tunnel endpoints.

15. The computer system of claim 13, the program instructions further comprising:

program instructions to receive at least one virtual machine load information of a plurality of virtual machines associated with the first virtual network;

program instructions to generate a destination machine address of a second virtual machine associated with the first virtual network based, at least in part, on the at least one virtual machine load information from a plurality of virtual machines; and program instructions to send the destination machine address to the requesting virtual machine.

16. The computer system of claim 15, wherein the virtual machine load information includes one or more of the following: (i) current virtual machine bandwidth; (ii) allocated virtual machine bandwidth; (iii) current total number of active sessions for the plurality of virtual machines; and (iv) current type of active sessions for the plurality of virtual machines.

17. The computer system of claim 16, wherein program instructions to generate the destination machine address of a second virtual machine is further based, at least in part, on a ratio of the current virtual machine bandwidth and the allocated virtual machine bandwidth for the plurality of virtual machines.

* * * * *